United States Patent
Morris et al.

(10) Patent No.: US 8,009,991 B2
(45) Date of Patent: Aug. 30, 2011

(54) DYNAMIC OPTICAL SIGNAL TRACKING ON A DETECTOR ARRAY IN A FREE SPACE OPTICAL COMMUNICATION SYSTEM

(75) Inventors: Terrel Morris, Garland, TX (US); Michael Renne Ty Tan, Menlo Park, CA (US); Shih-Yuan Wang, Palo Alto, CA (US); R. Stanley Williams, Portola Valley, CA (US); Duncan Stewart, Menlo Park, CA (US); Marco Fiorentino, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 942 days.

(21) Appl. No.: 11/977,501

(22) Filed: Oct. 24, 2007

(65) Prior Publication Data
US 2009/0110406 A1    Apr. 30, 2009

(51) Int. Cl.
*H04B 10/10* (2006.01)
(52) U.S. Cl. ......... 398/129; 398/131
(58) Field of Classification Search ......... 398/129, 398/131
See application file for complete search history.

(56) References Cited

U.S. PATENT DOCUMENTS

| | | | |
|---|---|---|---|
| 3,223,948 A | 12/1965 | Bowman | |
| 4,720,691 A | 1/1988 | Rammos | |
| 5,151,673 A | 9/1992 | Warren | |
| 5,285,305 A | 2/1994 | Cohen et al. | |
| 5,521,734 A | 5/1996 | Frigo | |
| 5,896,211 A | 4/1999 | Watanabe | |
| 5,896,213 A | 4/1999 | Naganori et al. | |
| 5,926,077 A | 7/1999 | Milroy | |
| 6,002,818 A | 12/1999 | Fatchi et al. | |
| 6,163,642 A | 12/2000 | Huppenthal | |
| 6,398,425 B2 | 6/2002 | Williams et al. | |
| 6,763,151 B1 | 7/2004 | Bosso et al. | |
| 6,834,164 B1 | 12/2004 | Chan | |
| 6,975,514 B2 | 12/2005 | Morris | |
| 7,058,316 B2 | 6/2006 | Vilnrotter et al. | |
| 7,106,973 B2 | 9/2006 | Kube et al. | |
| 7,118,285 B2 | 10/2006 | Fenwick et al. | |
| 7,229,218 B2 | 6/2007 | Morris et al. | |
| 7,643,755 B2 * | 1/2010 | Rafferty et al. | 398/131 |
| 2006/0018216 A1 | 1/2006 | Morris et al. | |
| 2006/0034609 A1 | 2/2006 | Morris et al. | |
| 2006/0050754 A1 * | 3/2006 | Morris et al. | 372/50.12 |
| 2006/0076473 A1 | 4/2006 | Wilcken et al. | |

FOREIGN PATENT DOCUMENTS

| | | |
|---|---|---|
| JP | 10-022918 A | 1/1998 |
| KR | 10-2001-0015992 A | 3/2001 |

OTHER PUBLICATIONS

HPDC, "Dynamic Optical Signal Tracking on a Detector Array in a Free Space Optical Communication System", Internat'l Search Report for PCT/US2008/012097, filed Oct. 23, 2008. Report issued by Korean Intellectual Property Office, Mar. 31, 2009.

* cited by examiner

*Primary Examiner* — Leslie Pascal

(57) ABSTRACT

A free-space optical communication system includes a detector array having a plurality of detector elements and a transmitting source. Dynamic movement of the optical signal on the detector array is caused by changes in orientation of the transmitting source. A tracker tracks the movement of the optical signal in real-time on the detector array. An output signal is derived from at least one of the detector elements illuminated by the optical signal.

16 Claims, 8 Drawing Sheets

10101000001001001001010 1101 010100101010101010001111111 1011
⎵                      ⎵   ⎵                           ⎵
502                    504 502                         504
FIG. 4
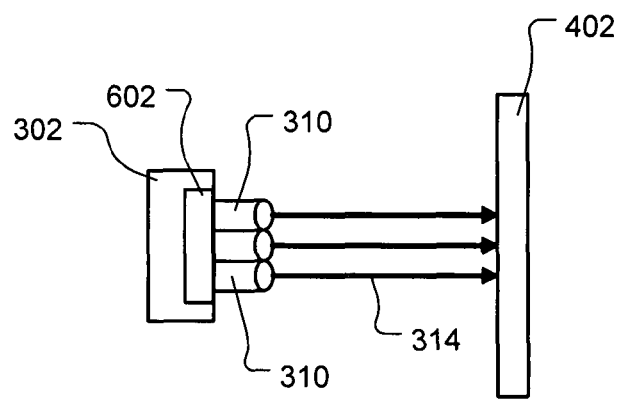
FIG. 5
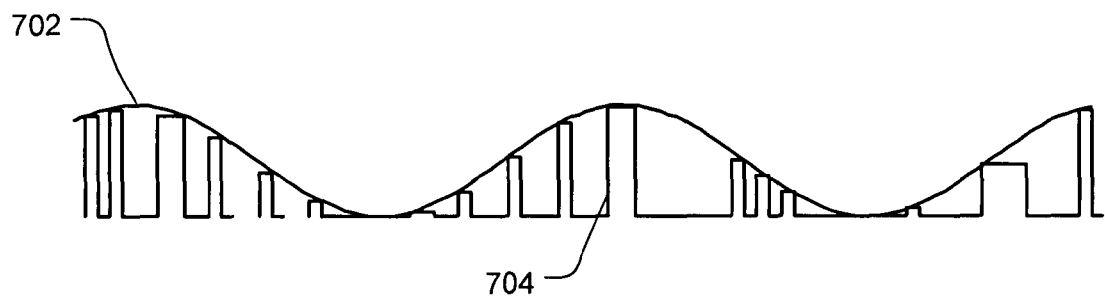
FIG. 6

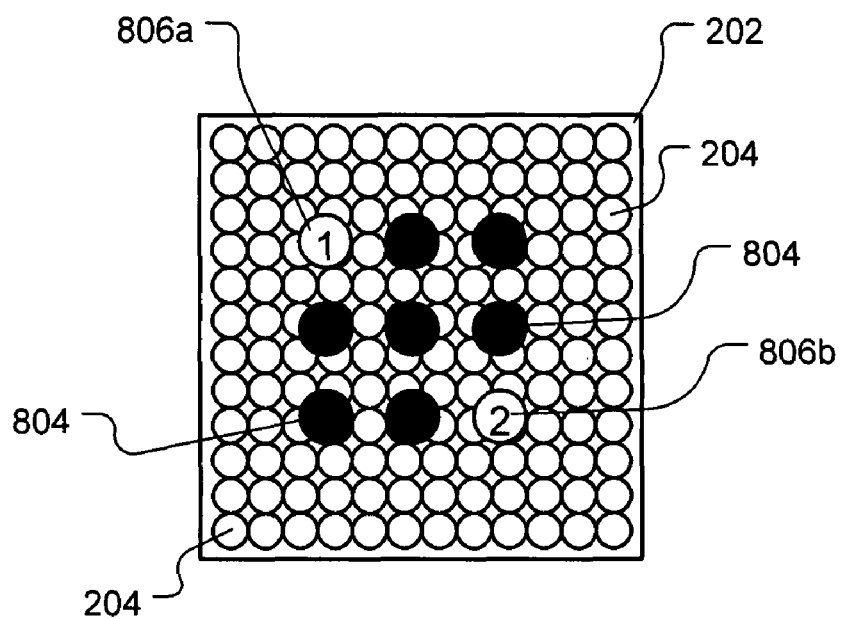
FIG. 7
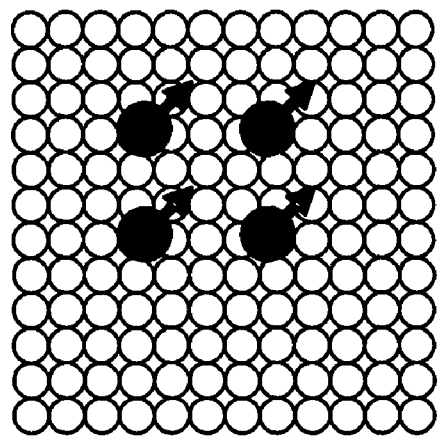
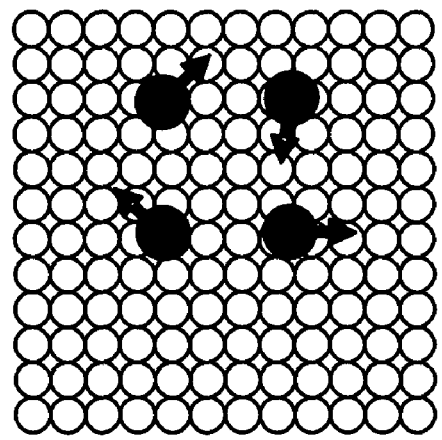
FIG. 8A  FIG. 8B

DYNAMIC OPTICAL SIGNAL TRACKING ON A DETECTOR ARRAY IN A FREE SPACE OPTICAL COMMUNICATION SYSTEM

BACKGROUND

Optical communications technology is finding increasing use in a variety of applications. For example, optical communications links are being considered for replacement of wire interconnections between integrated circuits on a circuit board, and between circuit boards within electronic systems.

One component in an optical communication link is a transmitter for transmitting an optical beam onto a light detector. A challenge in an optical communication link is alignment between the transmitter and the detector to ensure that the optical beam illuminates the light detector. This challenge becomes more complex when a number of transmitters and detectors are used within the optical communication link. Misalignment can result in cross-talk between optical beams, and, in extreme cases, incorrect data being received by one or more of the detectors.

Maintaining proper alignment can be particularly difficult within an electronic system, as tolerances in the card cage holding the circuit boards can result in varying positions of the circuit boards relative to each other. In addition to static changes in relative position present during initial placement of cards into the card cage, dynamic variations in relative position can be introduced during operation due to heating, vibration, and other environmental effects.

BRIEF DESCRIPTION OF THE DRAWINGS

Features and advantages of the invention will be apparent from the detailed description which follows, taken in conjunction with the accompanying drawings which together illustrate, by way of example, features of the invention; and, wherein:

FIG. 4 is an illustration of a digital information stream having a unique identifier code embedded therein in accordance with an embodiment of the present invention;

FIG. 5 is a block diagram of a free-space optical communication system wherein the transmitter includes a modulator to modulate the optical beams in accordance with an embodiment of the present invention;

FIG. 6 is an illustration of digital information stream having a unique identifier modulated onto the stream in accordance with an embodiment of the present invention;

FIG. 7 is an illustration of a detector array having several optical beams incident thereon in accordance with an embodiment of the present invention;

FIGS. 8A and 8B illustrate common mode movement and differential mode movement, respectively, of a plurality of optical beams incident on a detector array in accordance with an embodiment of the present invention;

DETAILED DESCRIPTION OF EXAMPLE EMBODIMENTS

In describing embodiments of the present invention, the following terminology will be used.

The singular forms "a," "an," and "the" include plural referents unless the context clearly dictates otherwise. Thus, for example, reference to "a component surface" includes reference to one or more of such surfaces.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art.

Reference will now be made to the exemplary embodiments illustrated, and specific language will be used herein to describe the same. It will nevertheless be understood that no limitation of the scope of the invention is thereby intended.

Figure 1:
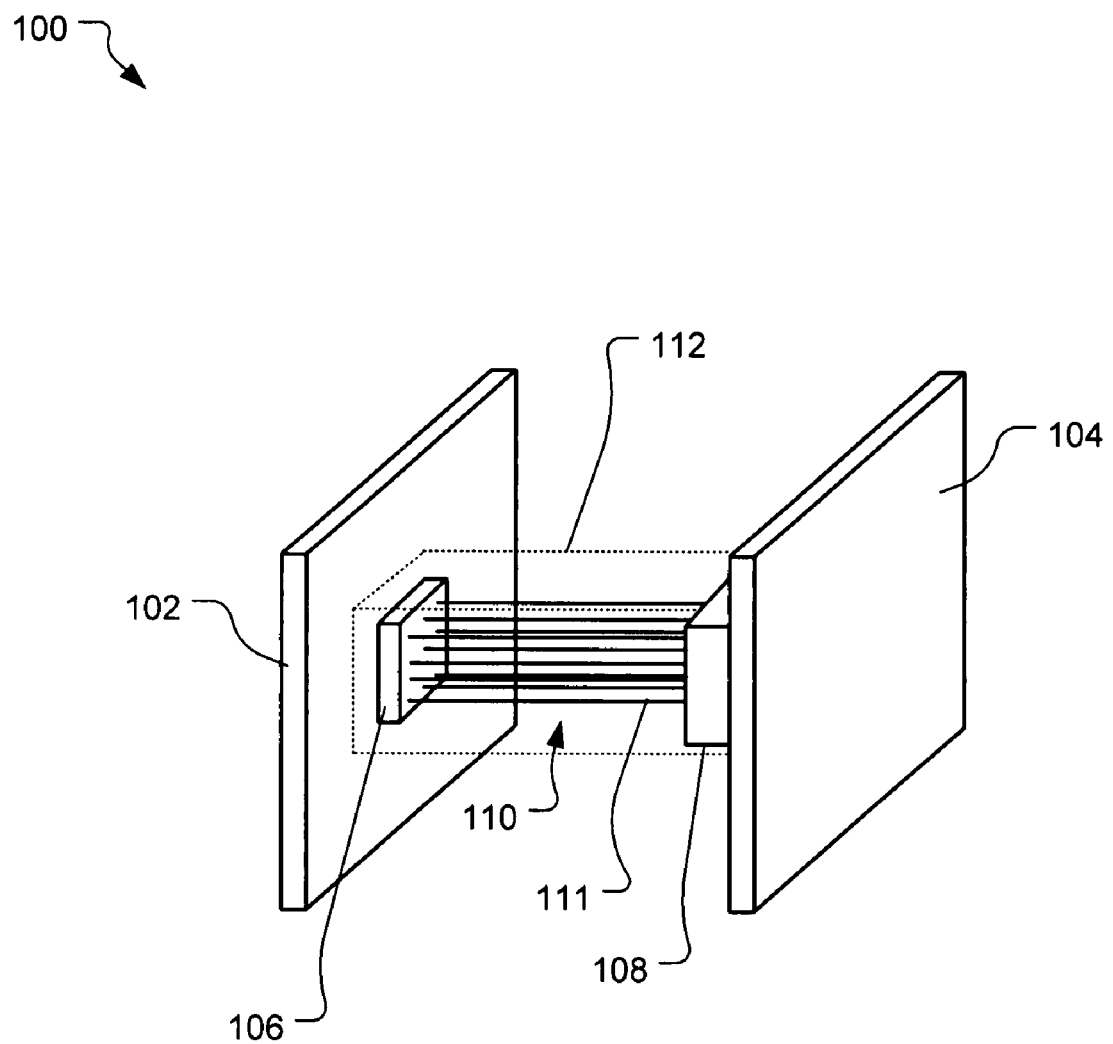
FIG. 1 is a side view illustration of electronic system for optical communication between circuit boards in accordance with an embodiment of the present invention.

An electronic system for optical communication between circuit boards has been developed as illustrated in FIG. 1 in accordance with an embodiment of the present invention. The electronic system, shown generally at 100, includes a first circuit board 102 having a transmit array 106 disposed thereon; and a second circuit board 104 having a detector array 108 disposed thereon. The transmit array is positioned opposite the detector array to form an optical communication link 110 with the transmit array. The optical communications link includes at least one optical beam 111 that originates from the transmit array and is received on the detector array. The optical communications link is a free-space link and each optical beam has information encoded therein. For example, information may be modulated onto the optical beam(s) using amplitude, phase, frequency, or other modulation formats. The optical communications link therefore couples the first and second circuit boards and is capable of communicating information from the first circuit board to the second circuit board. For example, information may be encoded as digital data transferred in serial, parallel, or combined formats.

The transmission of the information in the optical communications link 110 can be inhibited by dust and other light obstructing particles. The particles may cause errors in the communications link and disrupt communication between the first circuit board 102 and the second circuit board 104. Accordingly, the electronic system 100 may include a shielding apparatus 112 disposed between the transmit array 106 and the detector array 108. The shielding apparatus encloses the optical path between the transmit array and the detector array, helping to prevent light obstructing particles from interfering with the optical communications link, and providing an unobstructed optical path between the transmit array and the detector array. Various embodiments of the shielding apparatus can be used.

For example, the shielding apparatus 112 may be removably coupled between the first 102 and second 104 circuit boards. The shielding apparatus may also be rigidly mounted between the boards or slidably engageable with the circuit boards.

Figure 2A:
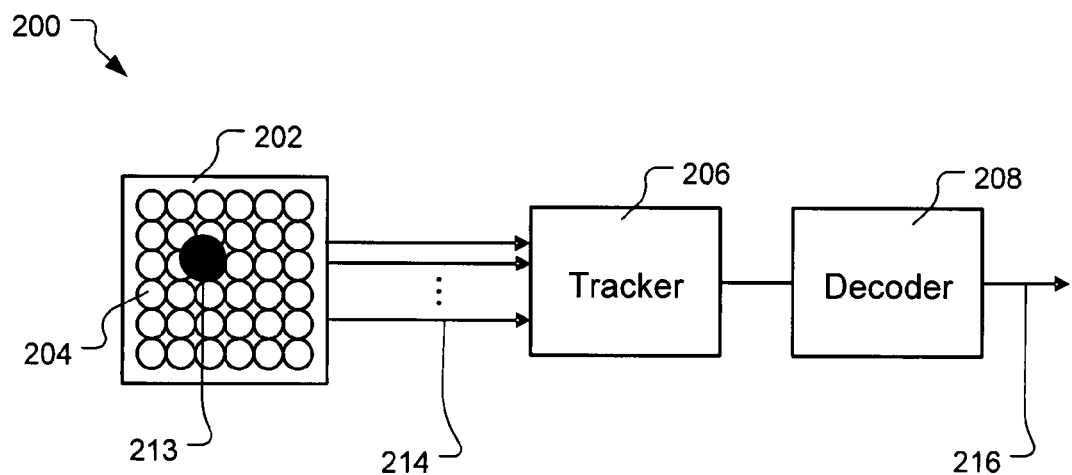
FIG. 2A is a block diagram of a free-space optical communication system in accordance with an embodiment of the present invention.
Figure 2B:
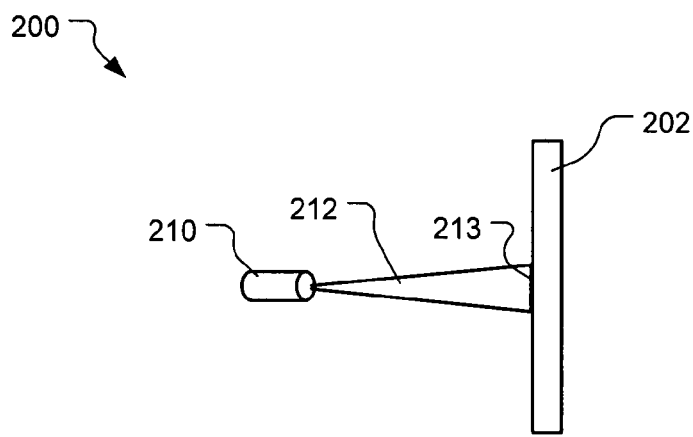
FIG. 2B is a side view illustration of the system of FIG. 2A.

Turning to a discussion of the optical communication link 110 in further detail, FIG. 2A and FIG. 2B illustrate an exemplary free-space optical communication system in accordance with another embodiment of the present invention. The free-space communication system 200 has an optical signal 212 originating from a transmitting source 210 and received on a detector array 202. The detector array includes a plurality of detector elements 204. Each detector element is operable to receive an optical signal and output a detector signal 214. The optical signal impinges on the detector array, covering an area 213 which may illuminate one, two, or a plurality of detector elements simultaneously. If desired, the optical signal may be deliberately diffused or spread into a divergent beam to help ensure that multiple detector elements are simultaneously illuminated.

The system 200 may be affected by static changes in relative position between the transmitting source 210 and the detector array 202 during positioning and setup of the components. Additionally, the system can be subject to dynamic variations in relative position introduced during operation due to shock, vibration, temperature changes, and other environmental effects. During operation, the dynamic variations cause changes in orientation and translation in the transmitting source, which cause the optical signal 212 to move about the detector array. The movement may cause the optical signal to, over time, illuminate a sequence of the detector elements 204.

A tracker 206 is coupled to the detector array 202 and operable to electronically track dynamic movement of the optical signal 212 on the detector array. The tracker determines which detector elements 204 are receiving the optical signal, and the tracker utilizes the detector signals 214 to track the concurrent location of the optical signal on the detector array. For example, the tracker may identify which detector elements are receiving the optical signal based on optical signal strength measurements, decoding of data, or other techniques. The tracker may dynamically determine the sequence of detector elements which receive the optical signal as a function of time. For repeatable motion, the tracker may be able to predict the movement of the optical signal, for example by including a phase tracking loop, Kalman filter, or similar device.

A decoder 208 is coupled to the tracker 206 and operable to output an output signal 216 derived from at least one of the detector signals 214 corresponding to a detector element 204 illuminated by the optical signal 212. For example, when a single detector element is illuminated, the decoder may select the detector signal from that single detector element for output as the output signal. When multiple detector elements are illuminated, the decoder may select one of the corresponding detector signals for output or the decoder may combine the corresponding detector signals for output. Further detailed discussion of the operation of the tracker is provided below.

It will be appreciated that the use of a large number of detector elements allows for electronic tracking of the movement of the optical signal across the detector array. Electronic tracking is beneficial, in that it can be performed rapidly. The electronic tracking may allow for more reliable link operation, as alignment becomes less critical and vibration can be accommodated. Furthermore, electronic tracking is relatively inexpensive, as the detector elements and required tracking electronics can be efficiently implemented in integrated circuit technology. Electronic tracking can replace mechanical steering and/or compensation provided at the transmit array.

In another embodiment of a free-space communication system 300, as shown in 3A and 3B, a transmit array 302 can include a plurality of transmitting sources 310 to transmit a plurality of optical signals 314. The optical signals are transmitted across free space and in the direction of a detector array 202. The detector array may include more detector elements 204 than there are transmitting sources. In other words, for each transmitting source, there is a plurality of detector elements. The optical signals each impinge on an area 313 of the detector array. The area may cover a portion of one or more detector elements.

It will be appreciated that the use of a transmit array 302 to transmit a plurality of optical signals 314 can increase in the data throughput of the free-space communication system.

The plurality of optical signals 314 illuminate a plurality of detector elements 204, generating a plurality of detector signals 314. As described above, the positions of the beams on the detector array 202 may vary due to change in orientations of the transmit array. The positions can be tracked electronically by a tracker 206. The tracker tracks the concurrent location of each optical signal on the detector array and uses the information to determine the identity of the transmitting source each detector signal originated from. The tracker communicates the information to the decoder 208 which derives a plurality of output signals 316 corresponding to the plurality of optical signals received. Various embodiments can be used to track dynamic movement of a plurality of optical signals as described further below.

When multiple beams are included in the free-space communications link, it can be helpful to provide a unique identity for each optical beam to aid the tracker in distinguishing between different optical beams. Various options for identifying the optical signals on the detector array are possible. For example, each optical signal can include data encoded therein that is to identify the transmitting source of each optical signal.

In one embodiment, as shown in FIG. 4, the unique identity of the optical signal is a digital identification code 504 encoded within digital information modulated onto the optical signal. The digital identification code is interspersed within the digital data bits 502. The digital identification code may be inserted at regular, known time intervals. As another example, the digital identification code may include a unique data pattern that does not otherwise occur within the digital data. It will be appreciated that the digital identification code is transmitted at a significantly higher frequency than the frequency of the dynamic movement so that the tracker 206 can update the positional information of the optical signal at a higher frequency than the movement of the signal, such that the detector signal can be concurrently identified and associated with the correct transmitting source. Thus, the tracker can concurrently identify which detector element is transmitting a detector signal associated with the uniquely identified optical signal.

In another embodiment, as shown in FIG. 5, the transmitting source 302 can include a modulator 602 to apply a modulation to the transmitted beams. As shown in FIG. 6, modulation 702 can be directly applied to the optical beam to encode the optical signal or data stream 704 with a unique identifier. It will be appreciated that the rate of modulation will be such that the tracker 206 can monitor the location of the optical signal on the detector array at a higher speed than the optical signal is moving. Thus, the tracker can concurrently identify which detector element is transmitting a detector signal associated with the uniquely identified optical signal. This identification can be used to select proper detector signals for output from the decoder 208.

As an alternative to using unique identifiers for the beams, beam identity can be based on positional information. For example, as illustrated in FIG. 7, some optical beams may be designated as positional signals 806a, 806b. Movement of the positional signals is tracked on the detector array 202. Other optical beams 804 are designated as data signals, each of the data signals having data encoded therein. The positional signals may transmit a unique identity to the detector array so that the tracker 206 can identify the position of the each of the positional signals. The unique identity may be transmitted via digital encoding or analog modulation as described above. The positional signal may transmit only identity information and include data, or the positional signals may also include data. Although two positional signals are shown, one, or more than two positional signals may also be used. Use of one positional signal can allow for tracking of common movement of the optical beams in one or two directions, while the use of two positional signals can also allow for tracking of rotation of the array. The tracker may track the position of the positional signals, and then determine which detector elements are illuminated by the data signals based on known distances between the positional signals and the data signals.

Tracking of the optical signals on the detector array can include an initialization protocol. The tracker 206, during the initialization protocol, maps an initial location of each of the plurality of data signals 804 and the positional signals on the detector array 802. The initial location of each of the data signals is mapped relative to the initial position of each of positional signals. When the positional signals move on the detector array during operation, the initial locations of the positional signals are updated by the tracker, and the tracker updates the relative position of each of the data signals. Thus, the position of each of the plurality of data signals is concurrently updated relative to the position of the positional signals.

Movement of the optical signals on the data array may include common mode and differential mode components. Common mode movement, as illustrated in FIG. 8A, is when all of the optical signals move in the same direction, which can include rotational and/or translational movement. Common mode movement is caused by changes in orientation or position of the transmit array relative to the receive array, for example, due to vibration or static misalignment.

The mapping of the data signals can account for common mode and update the relative locations of each of the data signal according to an algorithm based on the number of positional signals present in the system. The tracker 206 utilizes the relative location of each of the data signals to identify the transmitting source associated with a corresponding detector signal.

Differential mode movement is illustrated in FIG. 8B, and is when the optical signals move in different directions. Differential mode movement can be caused by changes in pointing direction between elements of the transmit array, for example, due to flexure of the transmit array from vibration or temperature changes.

The mapping of the data signals can account for differential mode by individually tracking the location of each data signal. Generally, differential mode movement is smaller than common mode movement.

In another embodiment, the tracker 206 may be configured to run a training program that maps a sequence of detector elements 204 which receive an optical signal 212 over a finite period of time. The training program communicates with the transmitting sources 210 and activates the optical signal. The tracker determines an initial location of the optical signal and operates the optical signal for a set period of time, wherein the training program maps the movement of the optical signal on the detector array 202 by creating a sequence of detector elements that receive the optical signal and output a detector signal. The sequence of detector elements may be a function of time or a list of detector elements that received the optical signal. The sequence of detector elements may be used to predict movement of the optical beam, such as movement caused by environmental effects such as vibration, which cause repetitive cyclical movement in the optical signal. After the training program has completed the system begins or resumes normal operation. The training program may be initiated by the tracker at any time. The tracker may utilize the sequence of detector elements to identify the transmitting source of the optical signal.

Figure 3A:
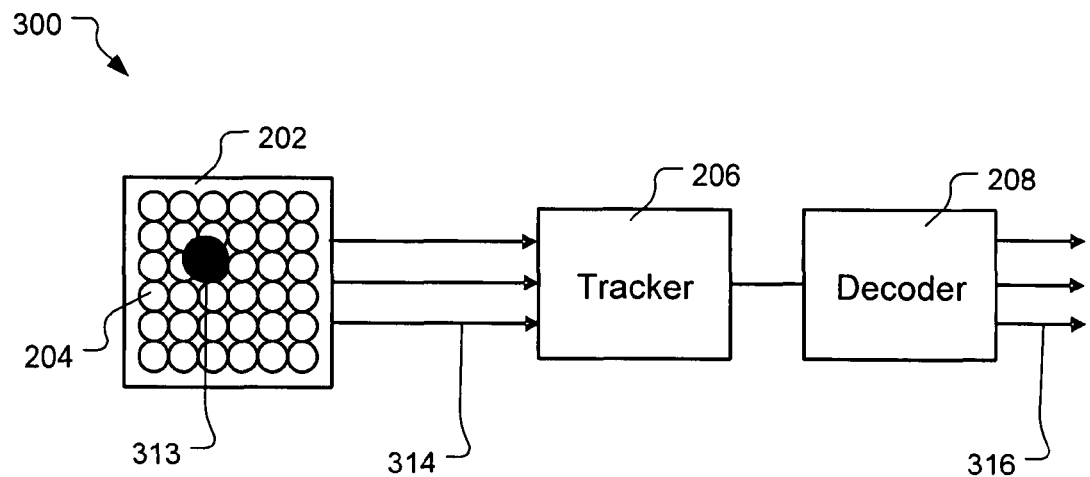
FIG. 3A is a block diagram of a free-space optical communication system in accordance with another embodiment of the present invention.
Figure 3B:
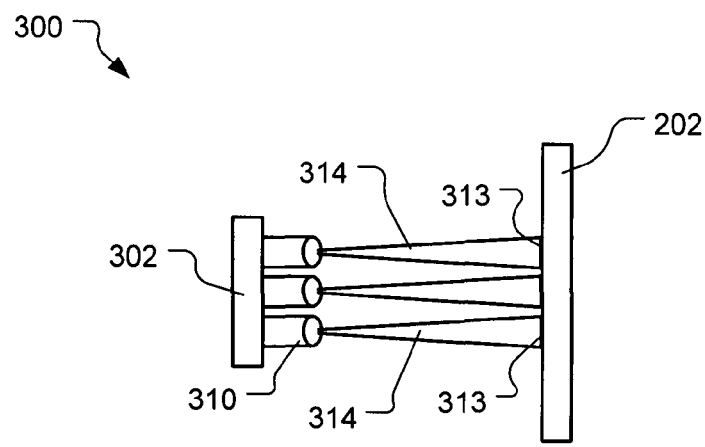
FIG. 3B is a side view illustration of the system of FIG. 3A.

The training program may also be used in systems with a transmit array 302 comprising a plurality of transmitting sources 310 and optical signals 312, similar to the system in FIG. 3. When there is more than one transmitting source, the tracker will run the training program for each source, mapping movement for each of the optical signals. After a sequence of detector elements has been created for each optical signal the training program will complete and the system will begin or resume normal operation. When multiple transmitting sources are present in a system, the movement of the optical beams may be differential, shown in FIGS. 8A and 8B, because the transmitting sources may not respond to vibration equally and therefore each optical signal may move in a slightly different pattern.

The benefit of the sequence of detector elements is that the tracker 206 can predictively map which detector elements 204 the optical signal 212 will illuminate. This also allows for identification of the transmitting source by the correlating the detector signals with the mapped sequence as a function of time. Additionally, the training program accounts for differential movement by creating a sequence for each transmitting source present in the system.

Figure 9:
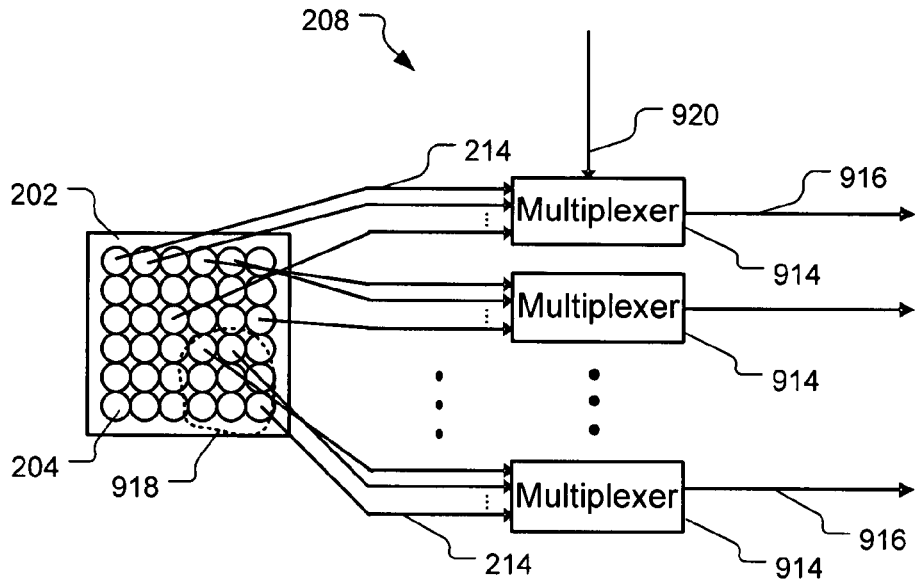
FIG. 9 is a detailed block diagram of a detector implemented using a plurality of multiplexers in accordance with an embodiment of the present invention.

Turning now to the decoder, various ways of implementing the decoder can be used in embodiments of the present invention. As illustrated in FIG. 9, the decoder 208 can include one or more multiplexers 914 coupled to the detector array 202 in accordance with an embodiment of the present invention. For example, a single multiplexer can be connected to each detector element 204 of the detector array, allowing an output signal 916 to be developed based on which of the detector element is illuminated. Switching control 920 of the multiplexer can be provided by the tracker 206 (FIG. 2).

For an optical link using multiple beams, multiple multiplexers 916 can be provided in the decoder 208. Each multiplexer may be connected to every optical element 204; however, this results in a large amount of interconnect. When movement of the individual optical beams are each limited to a portion of the detector array 202, the multiplexer may be connected to partially overlapping subsets 918 of the detector elements as shown. For example, each multiplexer may be connected to one detector element corresponding to a nominal position of a beam on the detector array, and include connections to one or more rings of detector elements surrounding the nominal position to accommodate variation in the location of the optical beam.

Figure 10:
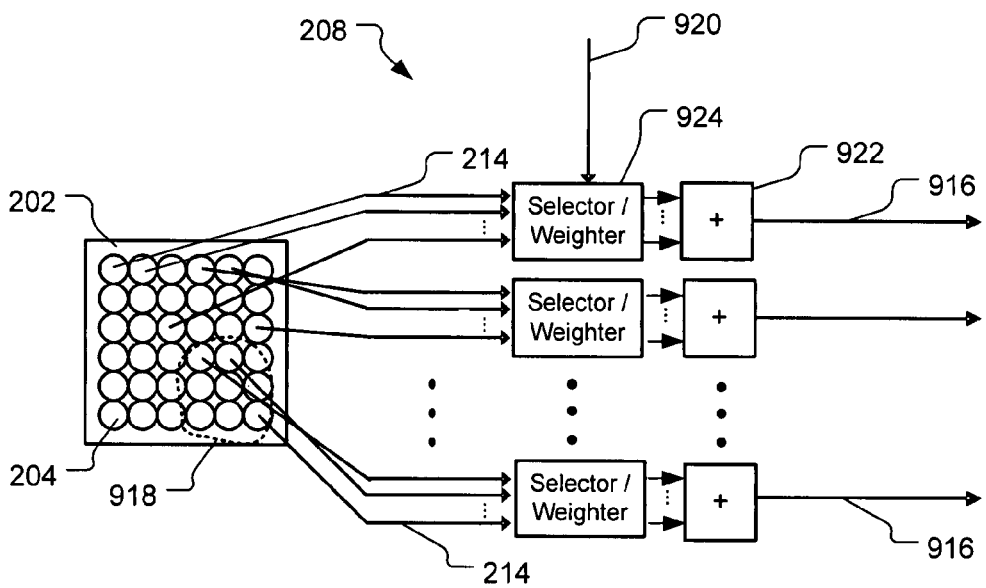
FIG. 10 is a detailed block diagram of a detector implemented using a plurality of adders in accordance with an embodiment of the present invention.

Alternately, as illustrated in FIG. 10, the decoder may include one or more adders 922 coupled to the detector array 202 in accordance with an embodiment of the present invention. The adders may be used to sum subsets 918 of the detector element 202 outputs corresponding to detector elements that are illuminated by the optical beam(s). As for the multiplexer, selection of which detector signals 214 are added can be provided under control of the tracker 206, for example, using switches or selector circuitry 924. If desired, the selection may include weighting of the signals prior to adding.

Figure 11:
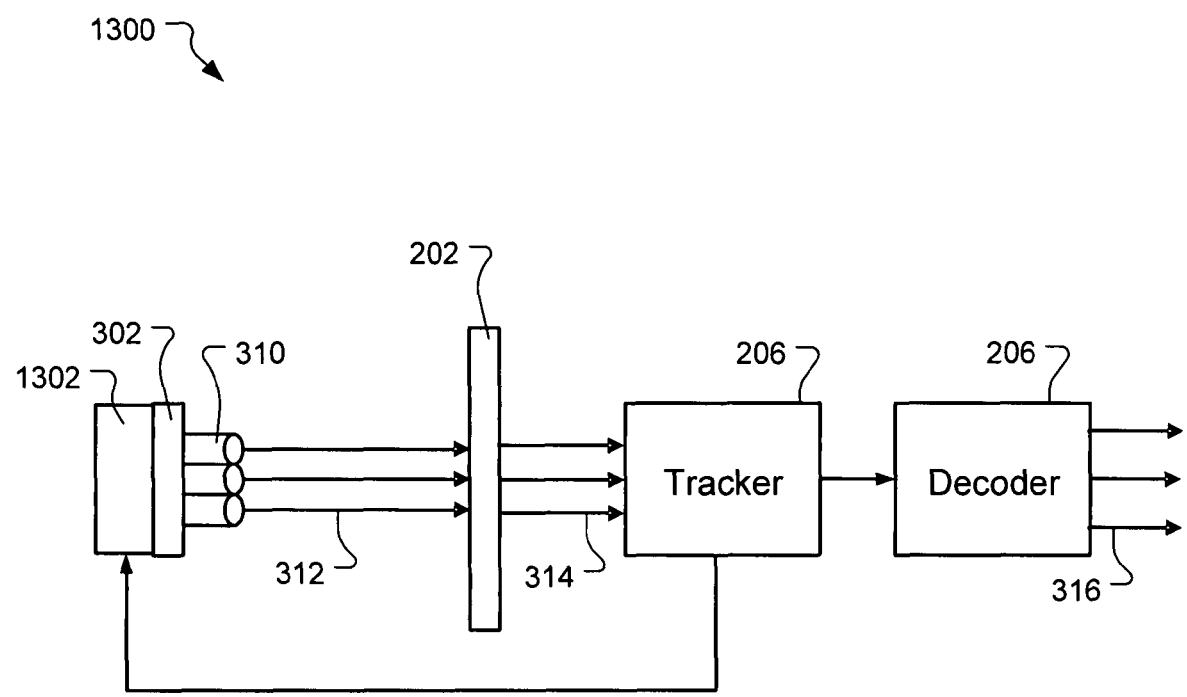
FIG. 11 is a block diagram of a free-space optical system having transmit beam steering in accordance with another embodiment of the present invention.

If desired, electronic tracking at the receive end of the optical link can be combined with mechanical steering at the transmit end of the optical link. For example, FIG. 11 illustrates an optical communications system 1300 having both mechanical steering and electronic tracking in accordance with an embodiment of the present invention. A steering mechanism 1302 is coupled to the transmitting source 302. The steering mechanism is operable to change a direction of the optical signal 312. The tracker 206 is connected to the steering mechanism to communicate feedback information to the steering mechanism. Accordingly, the steering mechanism can be controlled to reduce the amount of movement of the optical signal on the detector array 202. The steering mechanism can be combined with any of the aforementioned embodiments of the invention. The benefit of the steering mechanism is that it can provide limits to the movement of the optical signal, reducing the amount of space on the array that the optical signal illuminates.

Figure 12:
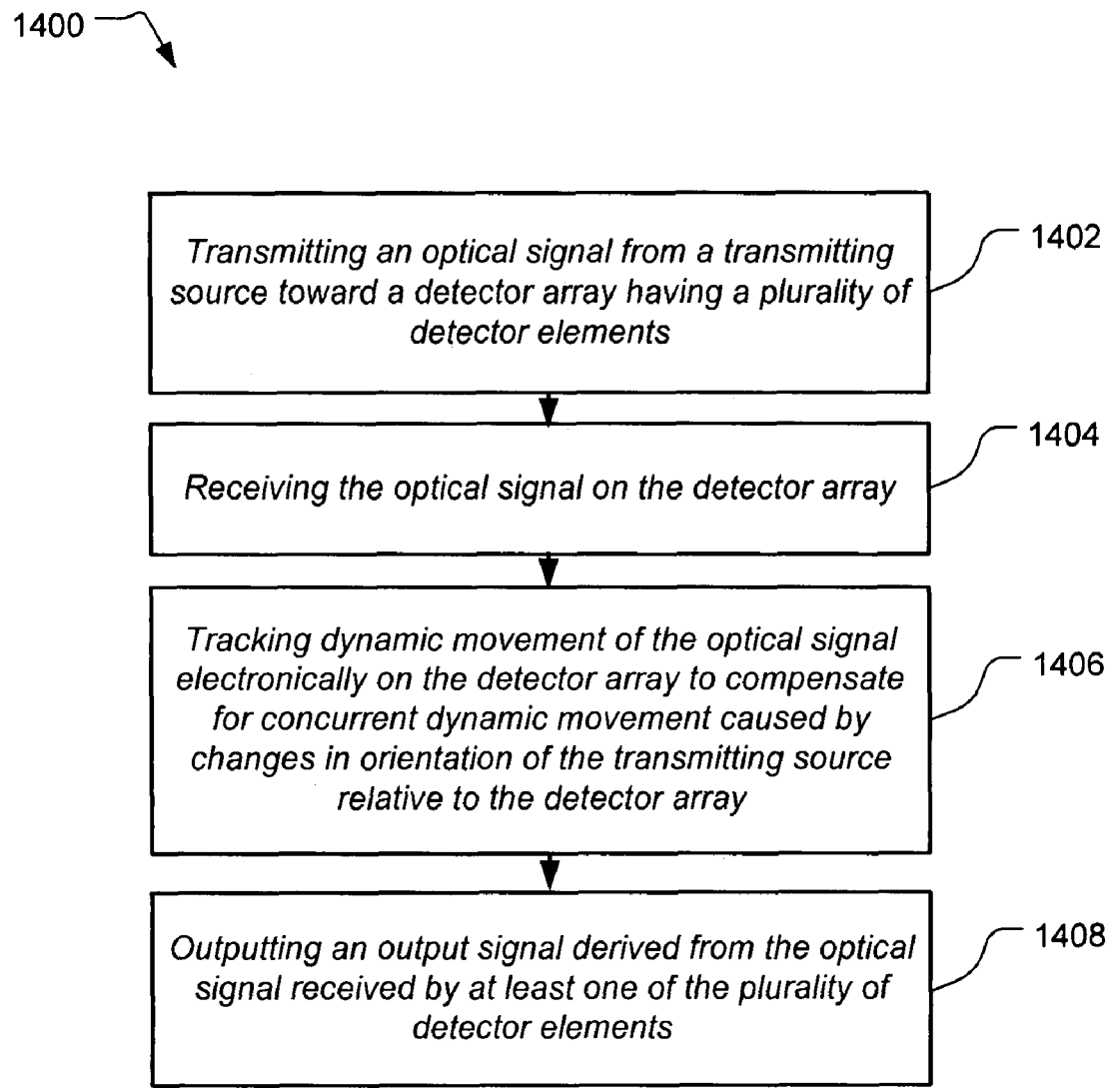
FIG. 12 is flow chart of a method of free-space optical communication in accordance with an embodiment of the present invention.

Finally, a method of electronically tracking free-space optical signals incident on a detector array is shown in flow chart form in FIG. 12. The method 1400 can include transmitting 1402 an optical signal from a transmitting source toward a detector array having a plurality of detector elements and receiving 1404 the optical signal on the detector array. For example, transmitting may use a transmit array and receiving may use a detector array as described above.

The method can include tracking 1406 dynamic movement of the optical signal electronically on the detector array to compensate for concurrent dynamic movement caused by changes in orientation of the transmitting source relative to the detector array and outputting 1408 an output signal derived from the optical signal received by at least one of the plurality of detector elements. For example, tracking may be performed using techniques as described above. The output signal may be derived by adding of, multiplexing or switching of detector element signals as described above.

Summarizing and reiterating to some extent, a free-space optical communication system in accordance with embodiments of the present invention can be used to provide dynamic tracking of optical signals during operation of an optical system. For example, a tracker coupled to a detector array can electronically track the movements of a plurality of optical beams incident upon the detector elements. The tracker can overcome the problem of identifying the transmitting source of each moving optical beam by using various means of electronic identification. Since the tracker is electronically identifying the position of the optical signals it can respond to dynamic movement at a much higher rate than mechanical means of tracking. Because the tracking is electronically controlled, a free-space optical communication system may be implemented with less complexity and greater reliability than purely mechanically aligned or adjusted system.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A free-space optical communication system with an optical signal originating from a transmitting source, comprising:
  a detector array, comprising a plurality of detector elements, each detector element operable to receive an optical signal and output a detector signal;
  a transmit array having a plurality of transmitting sources each transmitting an optical beam, wherein there are fewer transmitting sources than detector elements;
  a modulator coupled to at least one of the transmitting sources and configured to apply a modulation to the optical beam to encode a unique beam identifier;
  a tracker coupled to the detector array and operable to electronically track dynamic movement of the optical signal from a first detector element to a second detector element on the detector array, wherein the movement of the optical signal is caused by real-time changes in orientation of the transmitting source; and
  a decoder coupled to the tracker and operable to output an output signal derived from at least one of the detector signals corresponding to a detector element illuminated by the optical signal.

2. The system of claim 1, further comprising an electronic system comprising:
  a first circuit board having the transmit array disposed thereon;
  a second circuit board having the detector array disposed thereon, wherein the transmit array is positioned opposite the detector array to form an optical communication link with the transmit array; and
  wherein the optical communication link is capable of communicating information from the first circuit board to the second circuit board.

3. The system of claim 2, further comprising a shielding apparatus enclosing an optical path between the transmit array and the detector array.

4. The system of claim 1, wherein the optical signal illuminates at least two of the detector elements simultaneously, and at least two of the detector elements receives the optical signal simultaneously.

5. The system of claim 1, further comprising:
  a steering mechanism coupled to the transmitting source and operable to change a direction of the optical signal; and
  a connection from the tracker to the steering mechanism to communicate feedback information, wherein the steering mechanism can be controlled to reduce movement of the optical signal on the detector array.

6. A free-space optical communication system with an optical signal originating from a transmitting source, comprising:
  a detector array, comprising a plurality of detector elements, each detector element operable to receive the optical signal and output a detector signal;
  a tracker coupled to the detector array and operable to electronically track dynamic movement of the optical signal from a first detector element to a second detector element on the detector array, wherein the movement of the optical signal is caused by real-time changes in orientation of the transmitting source; and
  a decoder coupled to the tracker and operable to output an output signal derived from at least one of the detector signals corresponding to a detector element illuminated by the optical signal, wherein the decoder comprises at least one multiplexer coupled to the detector array, operable to receive the detector signal from each detector element and select at least one detector signal for output as the output signal as selected by a tracking signal from the tracker.

7. The system of claim 4, wherein the decoder comprises an adder coupled to the detector array and configured to add a subset of the detector signals to form the output signal, wherein the subset of detector signals is selected by the tracker.

8. A method for electronically tracking free-space optical signals incident on a detector array, comprising:
   transmitting an optical signal including a plurality of optical beams from a plurality of transmitting sources toward a detector array having a plurality of detector elements, wherein transmitting the plurality of optical beams comprises encoding each of the plurality of optical beams with a unique identifier;
   receiving the optical signal on the detector array;
   tracking dynamic movement of the optical signal electronically from a first detector element to a second detector element on the detector array to compensate for concurrent dynamic movement caused by changes in orientation of the transmitting source relative to the detector array; and
   outputting an output signal, including a plurality of beam output signals, each beam output signal corresponding to an optical beam, wherein the output signal is derived from the optical signal received by at least one of the plurality of detector elements.

9. The method of claim 8, further comprising diffusing the optical signal so that the optical signal impinges on multiple detector elements.

10. The method of claim 8, further comprising determining an initial location of the optical signal on the array of detectors.

11. The method of claim 8, wherein encoding each of the plurality of optical beams comprises modulating each of the plurality of optical beams with the unique identifier.

12. The method of claim 8, further comprising associating each beam output signal with an optical beam by utilizing the unique identifier.

13. A method for electronically tracking free-space optical signals incident on a detector array, comprising:
   transmitting an optical signal including a plurality of optical beams from a plurality of transmitting sources toward the detector array having a plurality of detector elements;
   receiving the optical signal on the detector array;
   tracking dynamic movement of the optical signal electronically from a first detector element to a second detector element on the detector array to compensate for concurrent dynamic movement caused by changes in orientation of the transmitting source relative to the detector array;
   outputting an output signal, including a plurality of beam output signals, each beam output signal corresponding to an optical beam, wherein the output signal is derived from the optical signal received by at least one of the plurality of detector elements; and
   mapping a sequence of detector elements that receive the optical signal as a function of time for at least one of the plurality of transmitting sources.

14. The method of claim 13, further comprising predicting movement of the optical signal on the detector array.

15. The method of claim 14, further comprising identifying at least one of the plurality of transmitting sources based on the sequence of detector elements.

16. The method of claim 13, further comprising mapping a location of each of the plurality of optical signals relative to a position of at least one positional signal originating from at least one positional transmitter.

* * * * *